United States Patent
Ikeda et al.

(10) Patent No.: US 7,661,710 B2
(45) Date of Patent: Feb. 16, 2010

(54) BLIND MEMBER FOR VEHICLE, AND GAP-CLOSING STRUCTURE INCLUDING BLIND MEMBER

(75) Inventors: Toshiaki Ikeda, Saitama (JP); Yasuyuki Tokutomi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 425 days.

(21) Appl. No.: 11/611,559

(22) Filed: Dec. 15, 2006

(65) Prior Publication Data
US 2007/0145731 A1 Jun. 28, 2007

(30) Foreign Application Priority Data
Dec. 26, 2005 (JP) ............... 2005-371343

(51) Int. Cl.
*B62D 1/18* (2006.01)
(52) U.S. Cl. ..................... 280/775
(58) Field of Classification Search ............. 280/775, 280/779; 180/90; 74/492, 493; 296/70
See application file for complete search history.

(56) References Cited
U.S. PATENT DOCUMENTS
4,899,612 A * 2/1990 Bruhnke et al. .............. 74/493
5,813,288 A * 9/1998 Simonetti ................... 74/492
7,300,072 B2 * 11/2007 Ercolano et al. ............ 280/779
2004/0129098 A1 * 7/2004 Gayer et al. ................. 74/18

FOREIGN PATENT DOCUMENTS
JP 2000-177600 6/2000
JP 2005-007965 1/2005
JP 2005-047476 2/2005

* cited by examiner

*Primary Examiner*—Paul N Dickson
*Assistant Examiner*—Robert A Coker
(74) *Attorney, Agent, or Firm*—Rankin, Hill & Clark LLP (57) ABSTRACT

The present invention provides a blind member for a vehicle, which is used in a steering device provided with a tilting structure that can adjust a position of a steering wheel in a vertical direction, and closes a gap between: an opening in an instrument panel provided on a driver's seat side and in which a steering column is inserted; and a column cover which surrounds around the steering column. The blind member includes: a blind main body which is arranged next to the column cover; and a hinge portion which attaches the blind main body to an edge of the opening in the instrument panel such that the blind main body can swing in the vertical direction.

6 Claims, 6 Drawing Sheets

BLIND MEMBER FOR VEHICLE, AND GAP-CLOSING STRUCTURE INCLUDING BLIND MEMBER

BACKGROUND OF THE INVENTION

Priority is claimed on Japanese Patent Application No. 2005-371343, filed Dec. 26, 2005, the contents of which are incorporated herein by reference.

BACKGROUND OF THE INVENTION

1. Field of the Invention

The present invention relates to a blind member for a vehicle, which closes a gap between an opening in an instrument panel and a steering member, and to a gap-closing structure including the blind member.

2. Description of the Related Art

As for a steering device for a vehicle, one is known which is provided with a tilting structure which can adjust the height of a steering wheel in the vertical direction. In this kind of steering device, since a steering column moves in the vertical direction by an adjustment by the tilting structure, a comparatively large gap is formed at a bottom side of the steering wheel, namely between the opening in the instrument panel and a column cover which surrounds a periphery of the steering column.

As for conventional arts for dissolving this problem, for example, one is proposed in which a plate-shaped blind member is attached onto the column cover so as to extend from the periphery thereof, and the blind member slidably contacts with an inside of an opening edge in the instrument panel (refer to Japanese Unexamined Patent Application, First Publication No. 2000-177600).

In addition, as another conventional gap-closing structure, one is proposed in which each ends of a rubber blind member having a curved-portion is fixed to a column cover and an opening in an instrument panel (for example, refer to Japanese Unexamined Patent Application, First Publication No. 2005-7965). In this gap-closing structure, the blind member always closes a gap between the column cover and the opening in the instrument panel, while allowing movements of the column cover by deflections of the blind member.

Moreover, this gap-closing structure can also correspond to movements of a telescopic structure which adjusts a position of a steering wheel forwards and backwards by deflections of the curved-portion of the blind member.

In the gap-closing structure disclosed in Japanese Unexamined Patent Application, First Publication No. 2000-177600, the plate-shaped blind member slidably contacts the inside of the opening edge in the instrument panel; however, it was difficult to always stably maintain the contact between the blind member and the opening edge in the instrument panel without having a gap therebetween. A stable contact in this construction requires increase in friction resistance of the blind member.

In addition, in the gap-closing structure disclosed in Japanese Unexamined Patent Application, First Publication No. 2005-7965, since each ends of the rubber blind member is fixed to the column cover and the opening edge in the instrument panel, the gap between the blind member and the column cover can always be closed. However, since the blind member is readily be suffered from sunrays through window glasses, and since a comparatively large stress is applied during position-adjustments onto the curved-portion which can be seen from the outside, it was concerned that aged deteriorations such as cockles and bends arise, and thereby causing deteriorations in the appearance thereof.

The present invention was made in view of the above-mentioned circumstances, and has an object of providing a blind member which can always reliably close a gap between a column cover and an opening edge in the instrument panel without causing aged deteriorations in the appearance, and a gap-closing structure including the blind member.

SUMMARY OF THE INVENTION

In order to achieve the above object, the present invention employed the followings.

That is, a first aspect of the present invention is a blind member for a vehicle, which is used in a steering device provided with a tilting structure that can adjust a position of a steering wheel in a vertical direction, and closes a gap between: an opening in an instrument panel provided on a driver's seat side and in which a steering column is inserted; and a column cover which surrounds around the steering column. The blind member includes: a blind main body which is arranged next to the column cover; and a hinge portion which attaches the blind main body to an edge of the opening in the instrument panel such that the blind main body can swing in the vertical direction.

According to the blind member for a vehicle of the first aspect, when the height of the steering wheel is adjusted in the vertical direction by the tilting structure, the blind member swings centering on the hinge portion, and thereby moves in the vertical direction together with the column cover.

Accordingly, the gap between the column cover and the edge of the opening in the instrument panel can always be closed reliably. Furthermore, since aged deteriorations will hardly occur to portions where can be seen from the outside, deteriorations in the appearance thereof can be prevented reliably.

In the blind member according to the first aspect of the present invention, the hinge portion may be an integral hinge which is made of a resin and unitarily forms one body with the blind main body.

In this case, since the integral hinge is employed as the hinge, which is made of a resin and unitarily forms one body with the blind main body, a construction thereof will be simplified, and thereby enabling further reduction in manufacturing cost.

A second aspect of the present invention is a blind member for a vehicle, which is used in a steering device provided with a tilting structure that can adjust a position of a steering wheel in a vertical direction, and a telescopic structure which can adjust the position of a steering wheel in a vehicle length direction, and closes a gap between: an opening in an instrument panel provided on a driver's seat side and in which a steering column is inserted; and a column cover which surrounds around the steering column. The blind member includes: a blind main body which is arranged next to the column cover; a hinge portion which attaches the blind main body to an edge of the opening in the instrument panel such that the blind main body can swing in the vertical direction; a restricting portion which restricts a relational displacement of the blind member in the vertical direction with respect to the column cover; and a slide guide portion which slidably guides the column cover in a longitudinal direction of a steering.

According to the blind member for a vehicle of the second aspect, when the height of the steering wheel is adjusted in the vertical direction by the tilting structure, the blind member in which a relational displacement with respect to the column cover in the vertical direction is restricted by the restricting portion, swings centering on the hinge portion, and thereby moves in the vertical direction together with the column cover. In addition, when a position of the steering wheel is adjusted in the vehicle length direction by the telescopic structure, the column cover moves in the vehicle length direction while the column cover is slidably guided by the slide guide portion.

Accordingly, the gap between the column cover and the edge of the opening in the instrument panel can always be closed reliably, even when the position of the steering wheel is adjusted either in the vertical direction or in the vehicle length direction.

In the blind member according to the second aspect of the present invention, the restricting portion and the slide guide portion may be unitarily formed so as to be one body.

In this case, the restricting portion which restricts the relational displacement in the vertical direction between the blind member and the column cover, and the slide guide portion which slidably guides the column cover in the longitudinal direction of the steering, are unitarily formed so as to be one body; therefore, the construction thereof can be simplified. Accordingly, the manufacturing cost thereof can be reduced.

In the blind member according to the second aspect of the present invention, the hinge portion may be an integral hinge which is made of a resin and unitarily forms one body with the blind main body.

In this case, since the integral hinge is employed as the hinge, which is made of a resin and unitarily forms one body with the blind main body, a construction thereof will be simplified, and thereby enabling further reduction in manufacturing cost.

A third aspect of the present invention is a gap-closing structure for a vehicle, which is used in a steering device provided with a tilting structure that can adjust a position of a steering wheel in a vertical direction, and a telescopic structure which can adjust the position of a steering wheel in a vehicle length direction, and closes, by a blind member, a gap between: an opening in an instrument panel provided on a driver's seat side and in which a steering column is inserted; and a column cover which surrounds around the steering column. The gap-closing structure includes: the blind member; a hinge portion which is provided to the blind member, and attaches the blind member to the edge of the opening in the instrument panel such that the blind member can swing in the vertical direction; a restricting portion which is provided between the blind member and the column cover, and restricts a relational displacement therebetween in the vertical direction; and a slide guide device which slidably guides the blind member and the column cover in a longitudinal direction of a steering.

DETAILED DESCRIPTION OF THE INVENTION

One embodiment of the present invention will be explained below with reference to the drawings. Moreover, in the following explanation, each of "forward side", "rearward side", "right side", and "left side" refers to directions with respect to a vehicle running direction, if no explanation is made.

Figure 1:
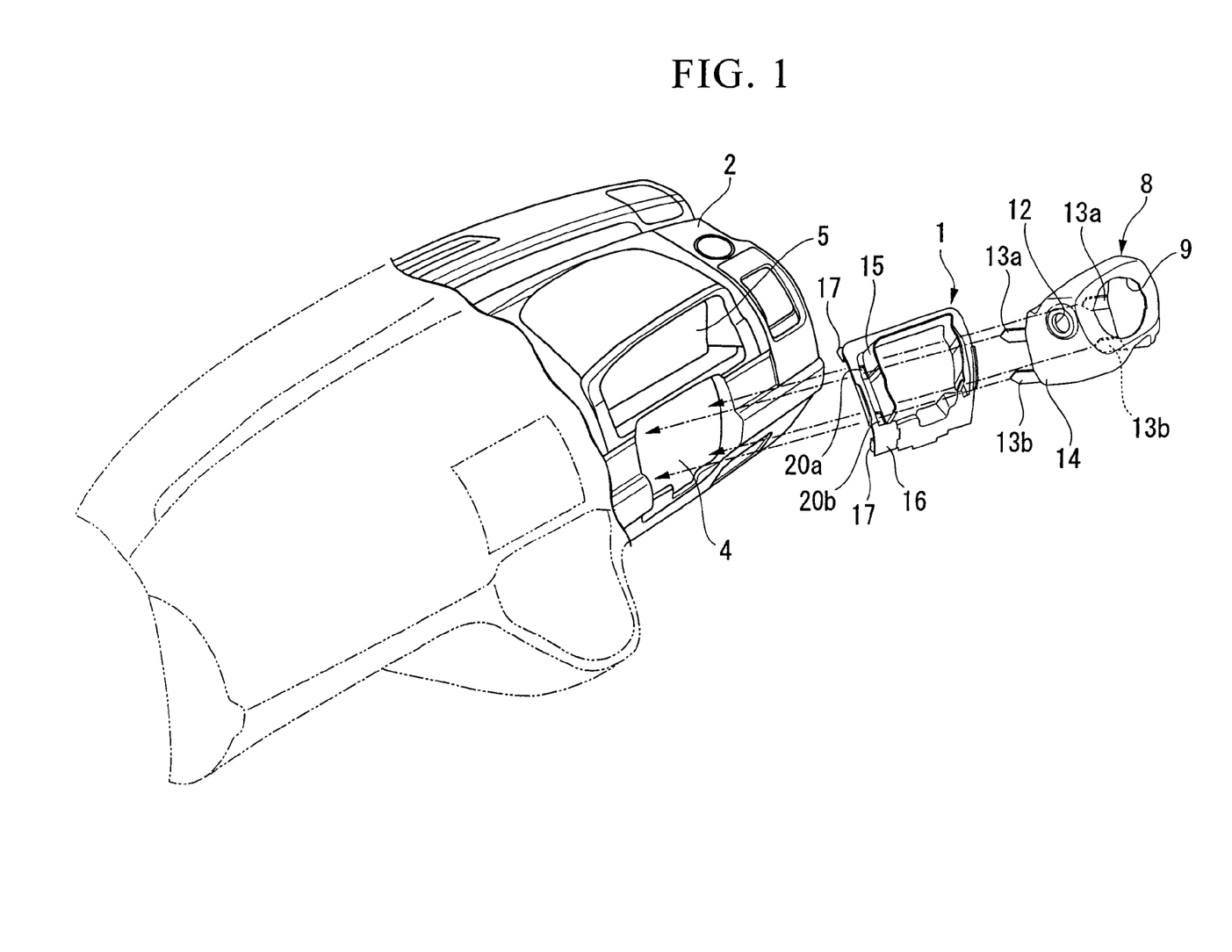
FIG. 1 shows one embodiment of the present invention, and shows an exploded perspective view of a steering-mounting portion in an instrument panel of a vehicle.

FIG. 1 shows an exploded perspective view of an instrument panel 2 to which a blind member 1 of the present embodiment is to be attached. As shown in FIG. 1, a vehicle of the present embodiment is so-called a right-hand driver car which is provided with driver's seat on the right side along the vehicle running direction. A substantially rectangular-shaped opening 4 is formed in the instrument panel 2 at a position where the steering is located, in order to insert a steering column 3 (refer to FIG. 2) on a driver's seat side. A display window 5 in which a speed meter and the like are located, is provided above the opening 4. Detailed explanations for the instrument panel 2 is omitted here; however, the instrument panel 2 has a construction in which plurality of skin panels are attached onto a cabin interior side surface of a frame panel.

The steering device employed in this vehicle is provided with a tilting structure which can adjust a position of a steering wheel 6 (refer to FIG. 2) in the vertical direction, and a telescopic structure which can adjust the position of the steering wheel 6 in the vehicle length direction. Since the tilting structure and the telescopic structure have well-known structures, the detail explanations for these structures are omitted here.

Figure 2:
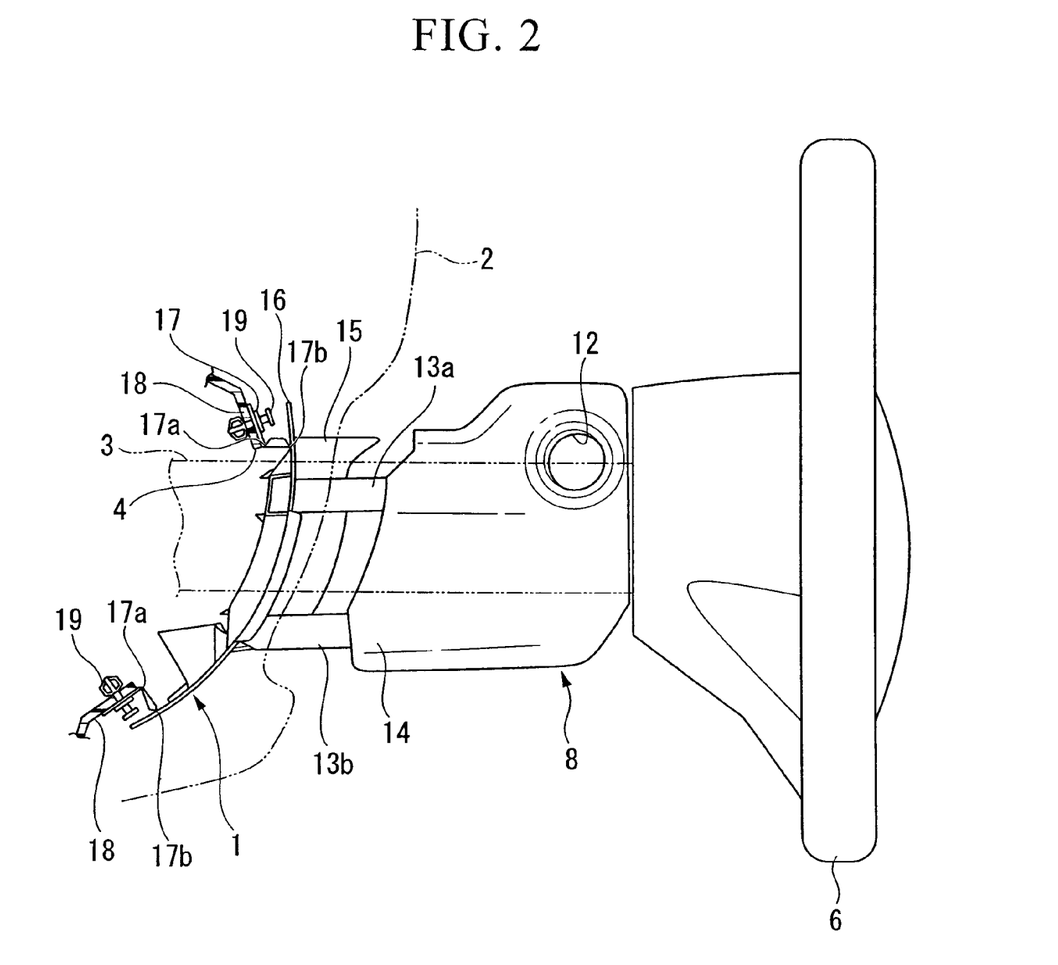
FIG. 2 shows a schematic vertical cross-sectional view of the instrument panel of the same embodiment, and a steering during assembling.

FIG. 2 shows an image of the steering column 3 set into the opening 4 in the instrument panel 2. A resin-made column cover 8 is attached onto the periphery of the steering column 3 at a position where is close to the steering wheel 6. As shown in perspective views of FIGS. 3 and 4, the column cover 8 is formed in a tube having substantially a rectangular-shape in cross section, and has an opening 9 through which an end of a steering shaft (not illustrated) protrudes toward the driver's seat side. On a right side wall of the column cover 8, a protruding hole 10 through which a winker lever (not illustrated) is inserted, and an installation hole 11 for installing a key cylinder (not illustrated), are formed. On a left side wall of the column cover 8, a protruding hole 12 through which a wiper lever (not illustrated) is inserted, is formed.

Figure 3:
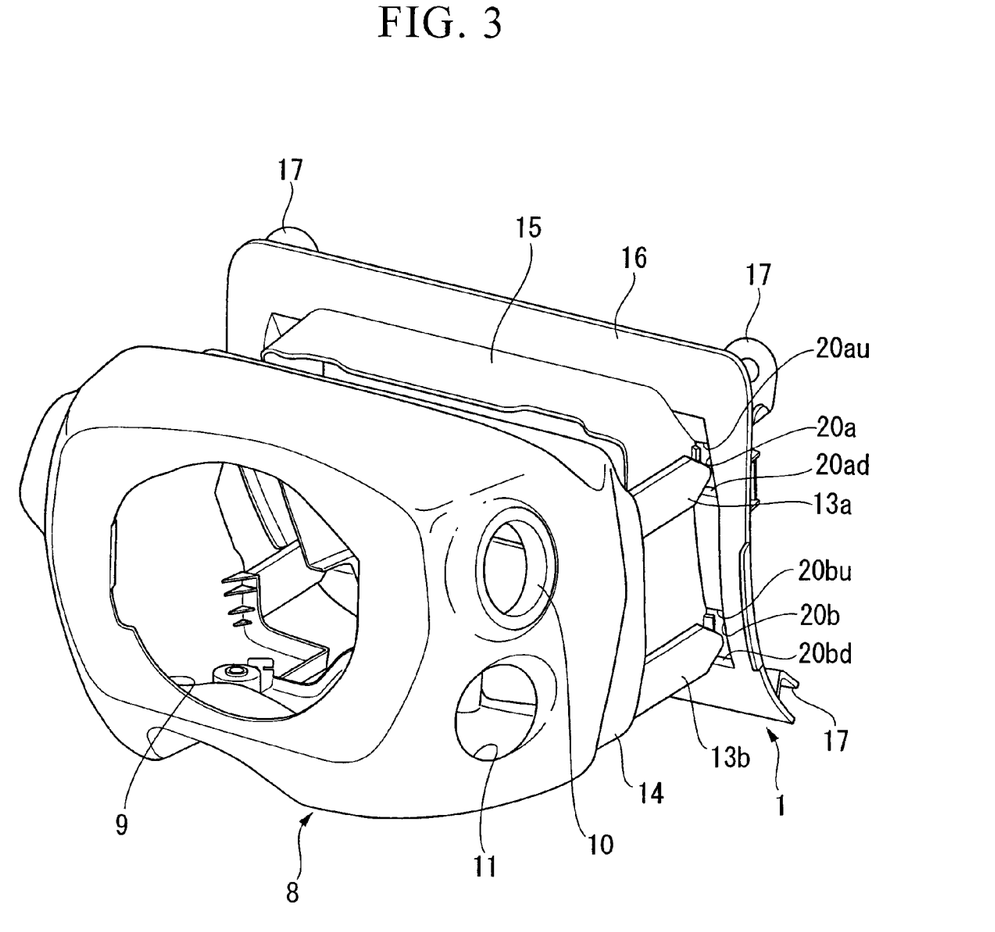
FIG. 3 shows an exploded perspective view of the steering-mounting portion of the same embodiment.
Figure 4:
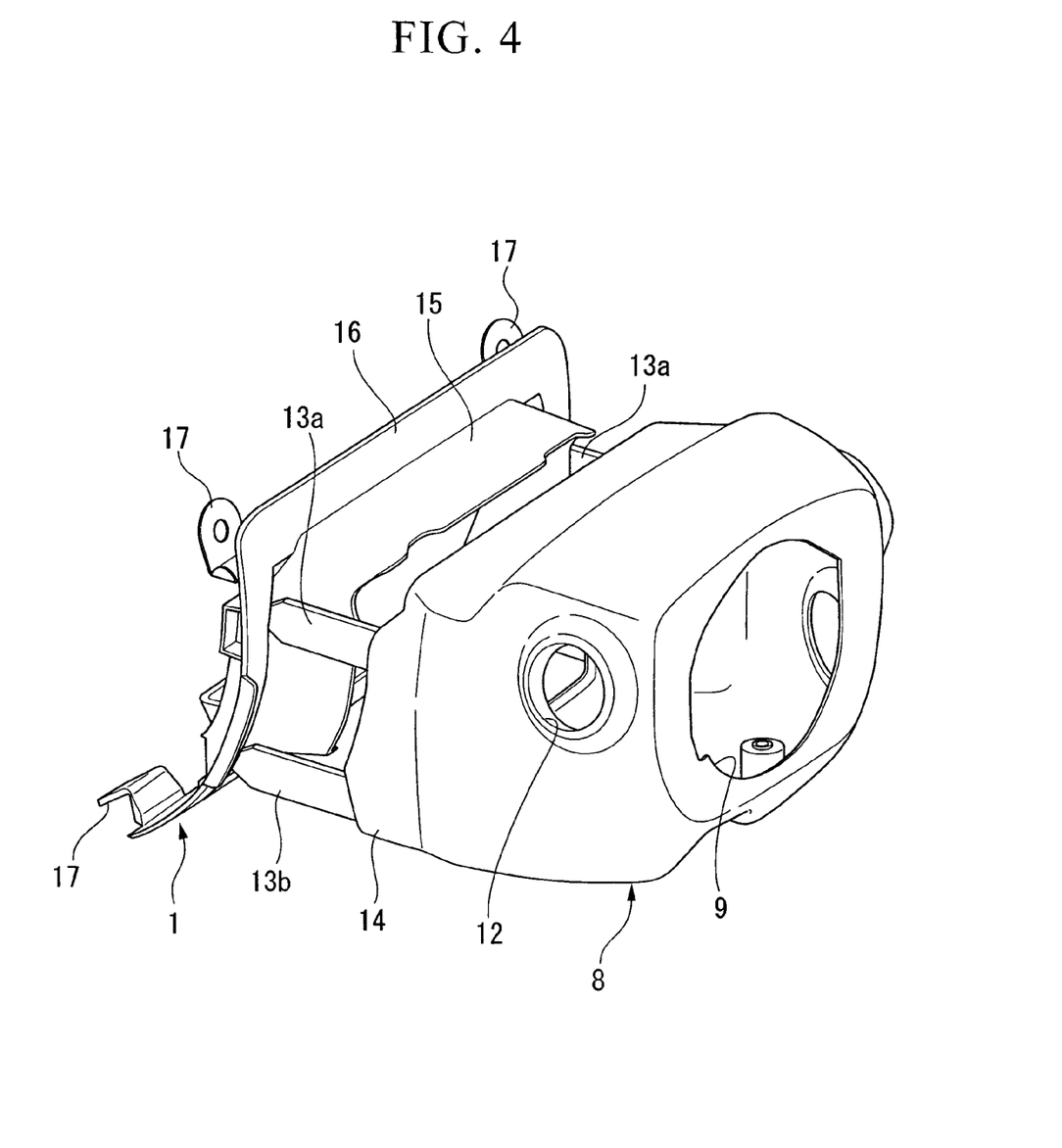
FIG. 4 shows an exploded perspective view of the steering-mounting portion seen from another angle of view.

Furthermore, on both side walls of the column cover 8, belt-shaped guiding pieces 13a and 13b which protrude forward in the vehicle direction are provided so as to extend from up and down thereof. Distal ends of these guiding pieces 13a and 13b become narrower and form soft curves, while middle portions of these guiding pieces 13a and 13b have constant width in the vertical direction.

On the other hand, a gap "d" (refer to FIG. 5) formed between the opening 4 in the instrument panel 2 and a leading edge portion 14 is closed by the resin-made blind member 1.

The blind member 1 extends in an axial direction of the steering column 3. The blind member 1 is provided with: a covering wall 15 having a substantially U-shaped cross-sectional shape and covering an upper portion and both side portions of the steering column 3; a substantially rectangular-shaped flange wall 16 which is unitarily formed with the covering wall 15 so as to extend outwardly from a forward end in the vehicle direction thereof; and hinge walls 17 which are provided at positions near four corners on a rearward face (an opposite side face to the face on which the covering wall 15 is provided) of the flange wall 16, and have substantially L-shaped cross section. The covering wall 15 is formed such that the cross section thereof has one-size smaller than that of the leading edge portion 14, and is located inside the leading edge portion 14 of the column cover 8 while attaching the column cover 8 to the blind member 1. Moreover, the leading edge portion 14 of the column cover 8 and the covering wall 15 of the blind member 1 always overlap with each other in the vehicle length direction, within a range in which the steering wheel 6 is moved by the telescopic structure. Among the hinge walls 17, those located on the upper side of the flange wall 16 bend upwardly, while those located on the lower side of the flange wall 16 bend downwardly. Bending pieces on the distal end sides of the hinge walls 17 on the upper side and on the lower side are, as shown in FIG. 2, fixed by clips 19 to a flange portion 18 provided to the opening 4 in the instrument panel 2.

Two bending portions 17a and 17b (the bending portion 17b is a connection between the hinge wall 17 and the flange wall 16) of each of the hinge walls 17 are made thinner. Each of the hinge walls 17 enables the flange wall 16 and the covering wall 15 moves in the vertical direction while being supported by the bending portions 17a and 17b. Each of the hinge walls 17 forms an integral hinge which forms one body together with the flange wall 16. In addition, in the present embodiment, each of the hinge walls 17 provided on the upper side and on the lower side of the flange wall 16 forms a parallel-linking structure. In the present embodiment, each of the hinge walls 17 including two bending portions 17a and 17b corresponds to a hinge portion of the present invention, while the flange wall 16 and the covering wall 15 corresponds to a blind main body of the present invention.

Substantially rectangular-shaped guiding holes 20a and 20b through which the guiding pieces 13a and 13b of the column cover 8 are inserted, are formed in the flange wall 16 of the blind member 1 at positions corresponding to the guiding pieces 13a and 13b. Upper inner faces and lower inner faces of the guiding holes 20a and 20b contact with upper exterior faces and lower exterior faces of the corresponding guiding pieces 13a and 13b, and thereby restricting relational displacements in the vertical direction between the blind member 1 and the column cover 8. Accordingly, in the present embodiment, each of interior faces 20au, 20ad, 20bu, and 20bd (refer to FIG. 3) of the guiding holes 20a and 20b corresponds to a restricting portion of the present invention, while an entire of the interior faces of the guiding holes 20a and 20b corresponds to a slide guiding portion of the present invention.

Since the above-mentioned constructions are employed in the present embodiment, when the steering device is assembled into the vehicle body, the gap "d" between the opening 4 in the instrument panel 2 and the column cover 8 is closed by the covering wall 15 and the flange wall 16 of the blind member 1.

Figure 5:
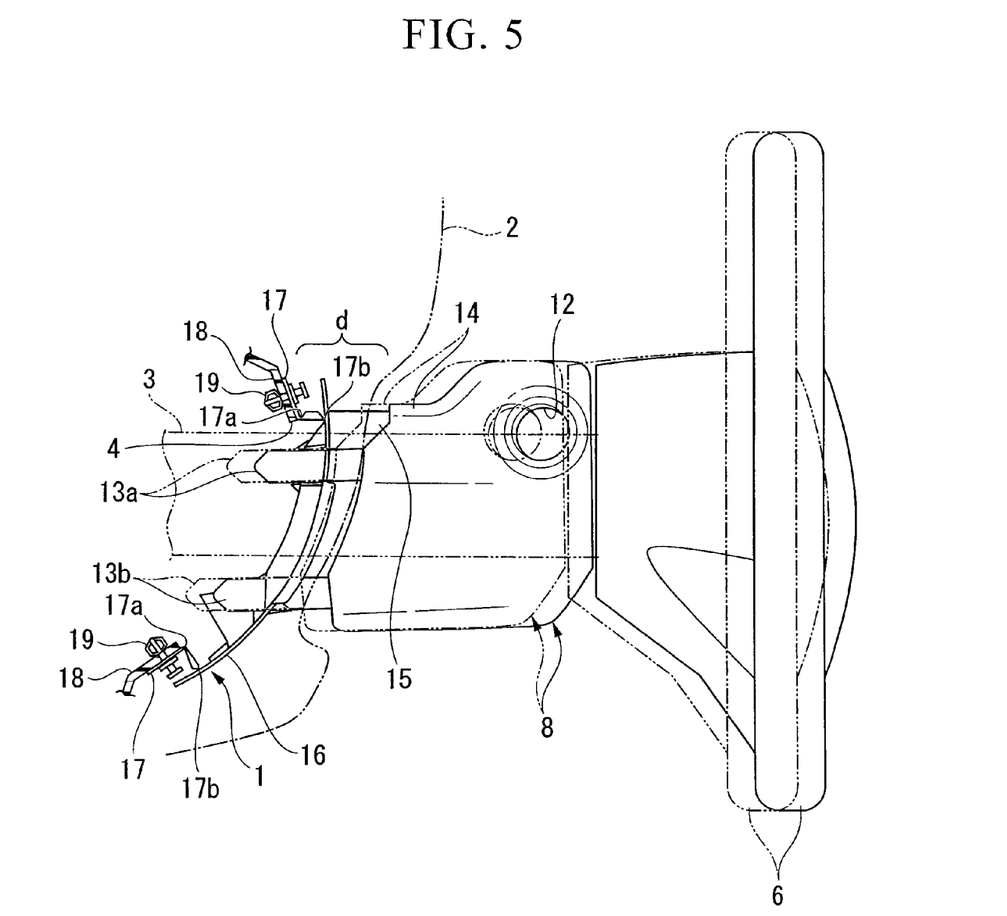
FIG. 5 shows a schematic vertical cross-sectional view of the instrument panel, and explains telescopic operations of the same steering-mounting portion.

When the steering wheel 6 at the rearward position (refer to solid lines in FIG. 5) is forwarded by operations of the telescopic structure, to a position indicated by two-dotted lines in FIG. 5, the column cover 8 is forwarded together with the steering wheel 6 while the guiding pieces 13a and 13b are guided by the corresponding guiding holes 20a and 20b in the blind member 1. As a result, an overlapping amount in the length direction between the leading edge portion 14 of the column cover 8 and the covering wall 15 of the blind member 1 increases. Accordingly, even when the column cover 8 moves forwards and backwards, a closed state of the gap "d" between the opening 4 in the instrument panel 2 and the column cover 8 will be maintained, and only the overlapping amount between the column cover 8 and the covering wall 15 of the blind member 1 will be changed.

Figure 6:
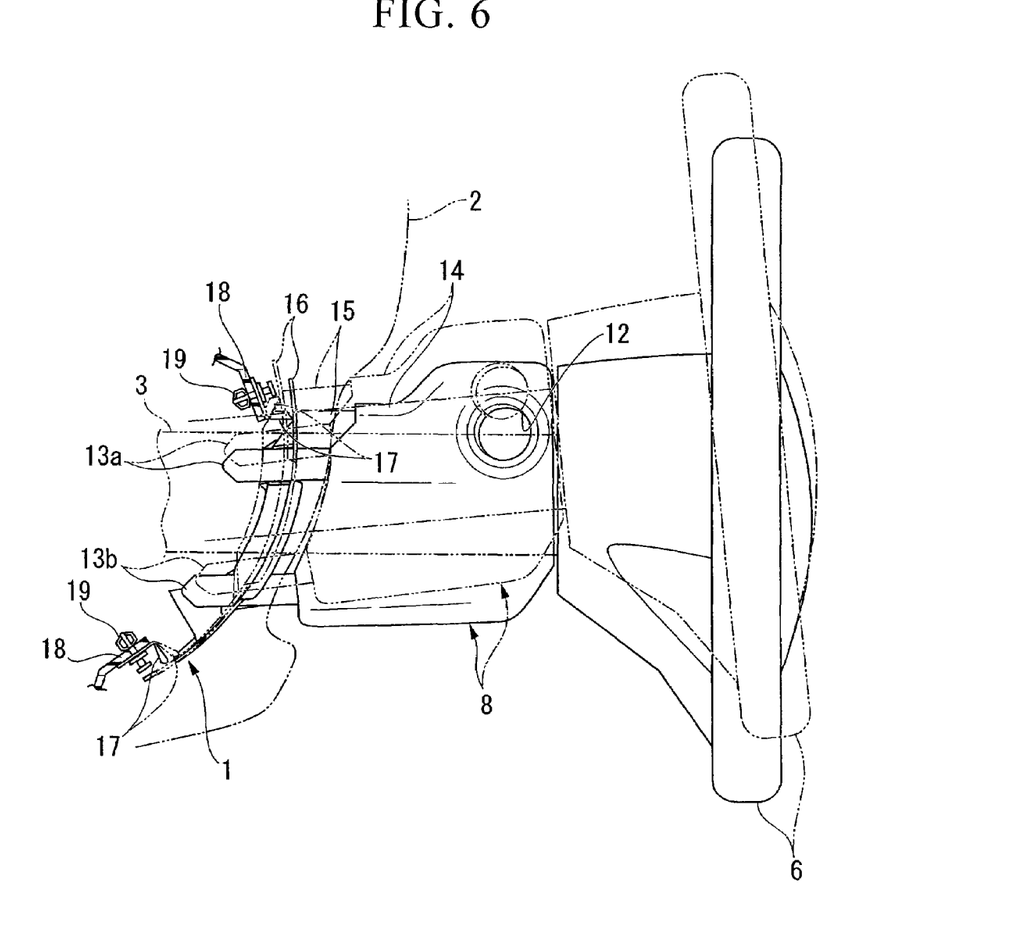
FIG. 6 shows a schematic vertical cross-sectional view of the instrument panel, and explains tilting operations of the same steering-mounting portion.

In addition, when the steering wheel 6 at the lower step position (refer to solid lines in FIG. 6) is raised by operations of the tilting structure, to an upper step position indicated by two-dotted lines in FIG. 6, the covering wall 15 and the flange wall 16 of the blind member 1 are unitarily raised together with the column cover 8 via joints between the guiding pieces 13a and 13b and the guiding holes 20a and 20b. At this time, the hinge walls 17 located on four corners of the flange wall 16 will bend centering on the thin bending portions 17a and 17b. Accordingly, even when the column cover 8 moves in the vertical direction, a closed state of the gap "d" between the opening 4 in the instrument panel 2 and the column cover 8 will be maintained, and only the bending states of the hinge wall 17 will be changed.

As has been explained in the above, in the gap-closing structure utilizing the blind member 1, even when the positional adjustment of the steering wheel 6 is performed in the forward and backward directions or in the up and down directions by the telescopic structure and the tilting structure, the closing state by the blind member 1 can be always maintained reliably by bending operations of the hinge walls 17 and sliding operations of the guiding pieces 13a and 13b in the guiding holes 20a and 20b. Accordingly, it is possible to reliably prevent deteriorations in the appearance and dust getting into the opening 4. In addition, since the hinge walls 17 and the guiding holes 20a and 20b are located at portions where are hardly seen from the outside, even when aged deteriorations arise at these portions, it will not introduce deteriorations in appearance of the vehicle.

In addition, in the gap-closing structure of the present embodiment, by slidably inserting the guiding pieces 13a and 13b of the column cover 8 into the guiding holes 20a and 20b of the blind member 1, the relational displacement in the vertical direction between the column cover 8 and the blind member 1 is restricted, and the relational displacement in the forwards and backwards between the column cover 8 the blind member 1 is slidably guided. Accordingly, a construction thereof can be simplified, and the manufacturing cost thereof can be reduced.

Furthermore, in the blind member 1 of the present embodiment, the hinge walls 17 being integral hinges are unitarily formed at four corner locations of the flange wall 16 by a resin molding. This construction is also helpful to the simplification in the construction and to the reduction in the manufacturing cost.

While a preferred embodiment of the invention has been described and illustrated above, it should be understood that this is an exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A blind member for a vehicle, which is used in a steering device provided with a tilting structure that can adjust a position of a steering wheel in a vertical direction, and closes a gap between: an opening in an instrument panel provided on a driver's seat side and in which a steering column is inserted; and a column cover which surrounds the steering column, wherein the blind member comprises:

a blind main body including an outwardly extending flange wall, said blind main body being arranged next to the column cover; and a hinge portion having a first leg and a second leg that form a substantial L-shape in cross section, said first leg being attached to the instrument panel and said second leg being attached to the flange wall, wherein a first bending portion is disposed between the first leg and the second leg and a second bending portion is disposed between the second leg and the flange wall such that the blind main body can swing in the vertical direction.

2. The blind member for a vehicle according to claim 1, wherein the hinge portion is an integral hinge which is made of a resin and unitarily forms one body with the blind main body.

3. The blind member for a vehicle according to claim 1, wherein the hinge portion is an integral hinge which is made of a resin and unitarily forms one body with the blind main body.

4. A blind member for a vehicle, which is used in a steering device provided with a tilting structure that can adjust a position of a steering wheel in a vertical direction, and a telescopic structure which can adjust the position of a steering wheel in a vehicle length direction, and closes a gap between: an opening in an instrument panel provided on a driver's seat side and in which a steering column is inserted; and a column cover which surrounds the steering column, wherein the blind member comprises:

a blind main body including an outwardly extending flange wall, said blind main body being arranged next to the column cover;

a hinge portion having a first leg and a second leg that form a substantial L-shape in cross section, said first leg being attached to the instrument panel and said second leg being attached to the flange wall, wherein a first bending portion is disposed between the first leg and the second leg and a second bending portion is disposed between the second leg and the flange wall such that the blind main body can swing in the vertical direction;

a restricting portion which restricts a relational displacement of the blind member in the vertical direction with respect to the column cover; and a slide guide portion which slidably guides the column cover in a longitudinal direction of a steering.

5. The blind member for a vehicle according to claim 4, wherein the restricting portion and the slide guide portion are unitarily formed so as to be one body.

6. A gap-closing structure for a vehicle, which is used in a steering device provided with a tilting structure that can adjust a position of a steering wheel in a vertical direction, and a telescopic structure which can adjust the position of a steering wheel in a vehicle length direction, and closes, by a blind member, a gap between: an opening in an instrument panel provided on a driver's seat side and in which a steering column is inserted; and a column cover which surrounds the steering column, wherein the gap-closing structure comprises:

the blind member including an outwardly extending flange wall;

a hinge portion having a first leg and a second leg that form a substantial L-shape in cross section, said first leg being attached to the instrument panel and said second leg being attached to the flange wall, wherein a first bending portion is disposed between the first leg and the second leg and a second bending portion is disposed between the second leg and the flange wall such that the blind member can swing in the vertical direction;

a restricting portion which is provided between the blind member and the column cover, and restricts a relational displacement therebetween in the vertical direction; and a slide guide device which slidably guides the blind member and the column cover in a longitudinal direction of a steering.

* * * * *